(No Model.)

E. F. CASTLEBERRY.
PLOW FOR CULTIVATING CORN OR COTTON.

No. 356,446. Patented Jan. 25, 1887.

Witnesses.
A. Ruppert.
G. H. Hess

Inventor.
E. F. Castleberry
per
Thomas T. Inspron
atty

UNITED STATES PATENT OFFICE.

ELISHA FRANCIS CASTLEBERRY, OF REAVES, ALABAMA.

PLOW FOR CULTIVATING CORN OR COTTON.

SPECIFICATION forming part of Letters Patent No. 356,446, dated January 25, 1887.

Application filed March 4, 1886. Serial No. 193,927. (No model.)

*To all whom it may concern:*

Be it known that I, ELISHA FRANCIS CASTLEBERRY, a citizen of the United States, residing at Reaves, in the county of Etowah and State of Alabama, have invented certain new and useful Improvements in Plows for Cultivating Corn or Cotton; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to plows adapted to be used in cultivating corn or cotton in new ground or land which contains roots of briers, cane, or grasses, or in clay soils.

The special object is to lessen the labor of horse and man in contending with the roots which are caught suddenly on an ordinary plow, so as to produce a sudden increase of the draft-strain, and to choke the plow so that it must be stopped and cleaned.

Figure 1:
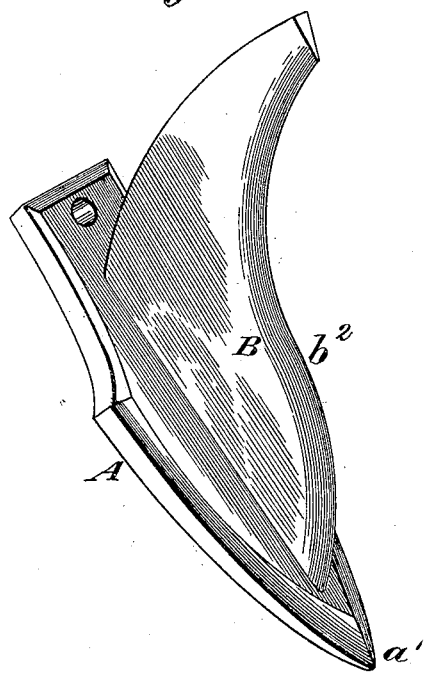
Figure 2:
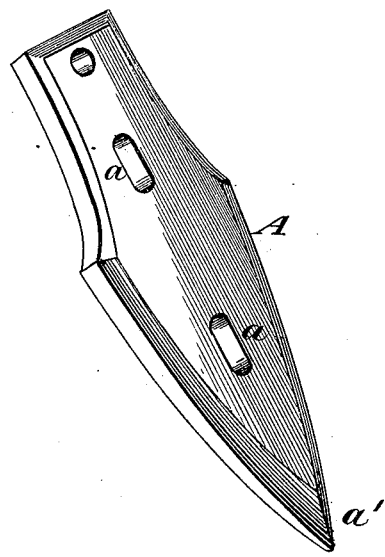
Figure 3:
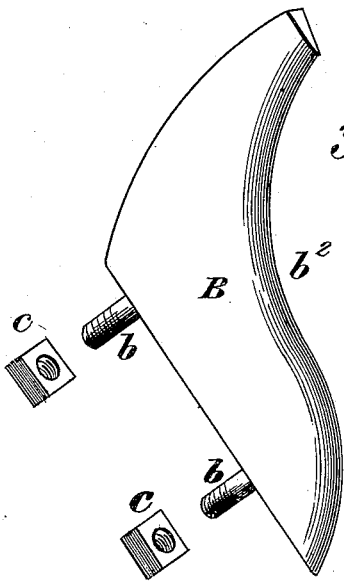

Figure 1 of the drawings is an elevation in perspective, showing my root plow or cultivator ready for attachment to the standard on any of the usual plow-frames. Fig. 2 is a detail view of the plow-iron, and Fig. 3 a similar view of the colter.

In the drawings, A represents a plow-iron, and B a colter, which together form my improved plow or cultivator for rooty ground or stiff lands. The colter B is attached to the plow-iron A by means of threaded tenons or screws $b\ b$, which pass through slots $a\ a$, and are held by the nut $c$ more or less near to the point $a'$. The latter is in a median longitudinal line and in alignment with the colter.

$b^2$ is an upwardly-rising and backwardly-inclined edge made sharp from front to rear, so as by a gradually pushing or "draw" cut to sever all roots which may come across it. Thus, as the plow-iron A runs under the roots and the latter are pressed across the sharp edge of colter it will be impossible for them to choke or suddenly check the plow, as is continually done with a common plow or cultivator.

As my plow simply crumbles, pulverizes, and lightens up the soil, there is no danger of covering up or injuring the young corn or cotton; hence I can run very close to the young plants and produce a fine tilth of the soil immediately around their tender rootlets. Thus they are enabled to utilize at once any aliment near them, and to obtain an early as well as a vigorous start. This is especially noticeable in the stiff lands, which are liable to bake and become more or less impermeable to the roots of the young plants.

I am aware that it is old to attach colters to drill-teeth, to attach a flat share to a cultivator-standard, and to make colters and shares adjustable; but

What I claim as new, and desire to protect by Letters Patent, is—

The flat plow-iron A, having its front end brought to a point and longitudinally slotted at $a\ a$, in combination with a colter, B, arranged on the median line of said plow-iron and provided with tenons $b\ b$, adjustable in said slots $a\ a$, and having a gradually-rising sharp edge, $b^2$, curved, as described, for the purpose of cultivating corn or cotton in stiff or rooty ground, substantially as set forth.

In testimony whereof I affix my signature in presence of two witnesses.

ELISHA FRANCIS CASTLEBERRY.

Witnesses:
   W. H. STANDIFER,
   BENJN. F. POPE.